(12) United States Patent
Takanashi

(10) Patent No.: US 6,304,390 B1
(45) Date of Patent: Oct. 16, 2001

(54) LENS HOUSING HAVING APERTURE DEVICE

(75) Inventor: Tatsuo Takanashi, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/514,432

(22) Filed: Feb. 28, 2000

(30) Foreign Application Priority Data

Mar. 2, 1999 (JP) .................................................. 11-054351

(51) Int. Cl.[7] .................................................. G02B 15/14
(52) U.S. Cl. .................................................. 359/699; 359/704
(58) Field of Search .................................. 359/699, 703, 359/704, 826

(56) References Cited

U.S. PATENT DOCUMENTS 5,583,595 * 12/1996 Hara et al. .............................. 396/79
5,668,670 * 9/1997 Nakayama et al. .................. 359/694

FOREIGN PATENT DOCUMENTS 10-90579 * 4/1998 (JP) .

* cited by examiner

Primary Examiner—Ricky Mack
(74) Attorney, Agent, or Firm—Ostrolenk, Faber, Gerb & Soffen, LLP

(57) ABSTRACT

A lens housing having an aperture device has a moving frame, a lens that is movable backward and forward, an aperture member fitted to the lens, and a cam cylinder having cam grooves for receiving cam followers. The aperture member has arm sections bent and extended from a substrate section having an aperture opening in the direction of an optical axis. The individual arm sections have engagement openings for receiving the cam followers, thereby the aperture member is fitted to the lens. The lens housing functions with reduced components and occupying space, thereby providing advantages in cost reduction and miniaturization.

17 Claims, 3 Drawing Sheets

LENS HOUSING HAVING APERTURE DEVICE

BACKGROUND OF THE INVENTION

1. Field of the Invention

The present invention relates to a lens housing having an aperture device. Particularly, the invention relates to a structure of a lens housing having an aperture device for limiting the amount of light or unnecessary light that is incident on an optical element.

2. Description of the Related Art

There are conventional types of lens housings that include apertures (aperture device). One example is a lens housing having an aperture to allow the light to pass, which is adhered to a lens-supporting frame (lens frame) or the like by use of an adhesive. In another example, the lens frame is not used, but a lens member is built into the lens housing. In this type, an aperture member is fitted to the lens member via an aperture-installation member dedicatedly provided for installation of the aperture member to the lens member.

In the described example where the aperture member is adhered to the lens member with an adhesive, the adhesive sometimes extends in a line state during adhesion, thereby causing adverse effects on the lens function. In the described example where the dedicated aperture-installation member is used, the number of components is increased, thereby providing disadvantages in cost and miniaturization.

SUMMARY OF THE INVENTION

In order to solve the problems described above, an object of the present invention is to provide a lens housing having an aperture device that allows reduction in the number of configuration components and in the occupied space, thereby providing advantages in cost reduction and miniaturization.

A lens housing of the present invention having an aperture device includes a moving frame, cam followers, and an aperture member having an aperture surface. In this, the aperture member is fitted to the moving frame such that engagement sections extending from the aperture surface are engaged with the cam followers, thereby moving backward and forward together with the moving frame.

Other characteristics and advantages of the present invention will be further illustrated in the description provided below.

DESCRIPTION OF THE PREFERRED EMBODIMENTS

Hereinbelow, a description will be given of embodiments of the present invention with reference to the drawings.

Figure 1:
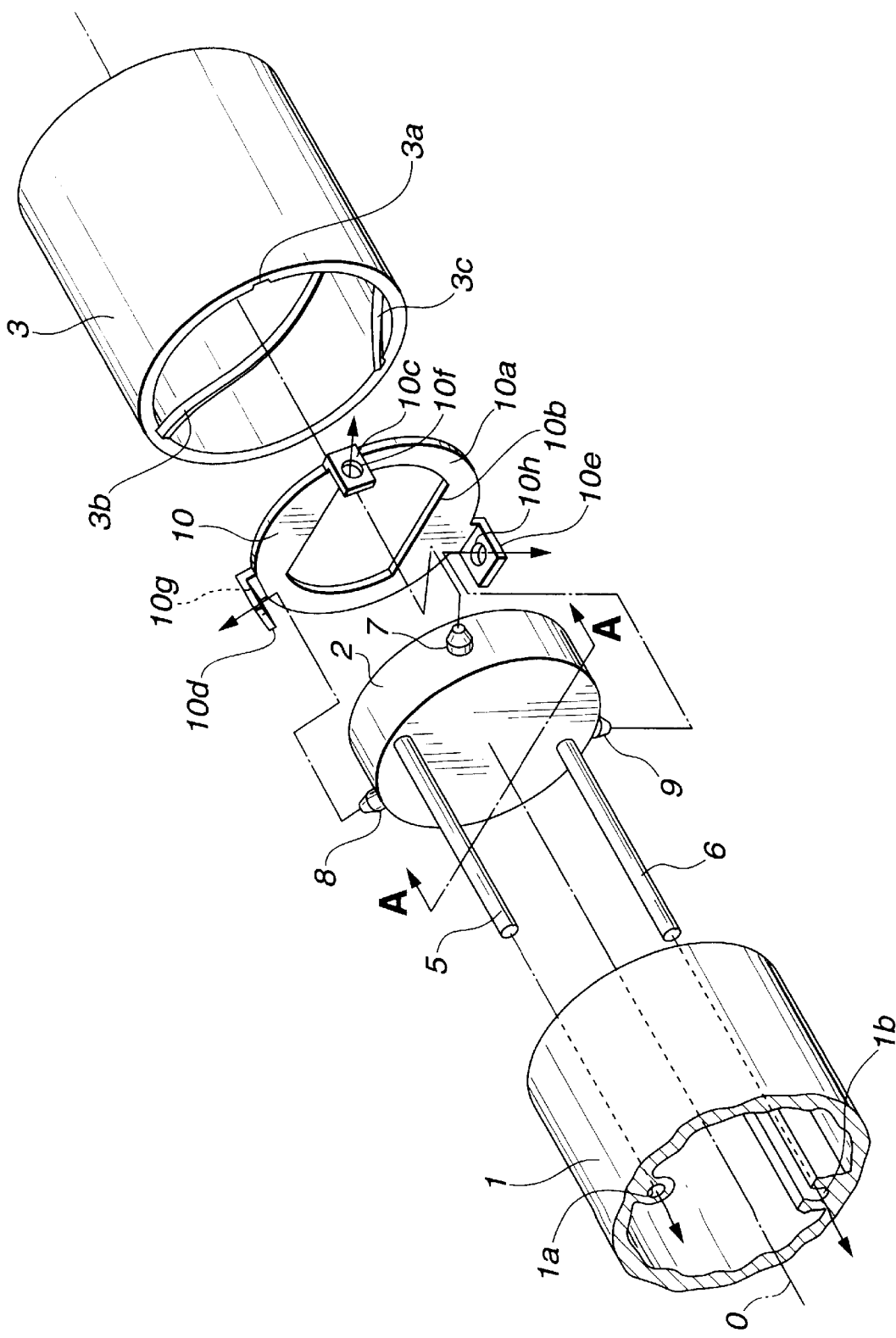
FIG. 1 is an exploded perspective view of a lens housing having an aperture device of a first embodiment according to the present invention.
Figure 2A:
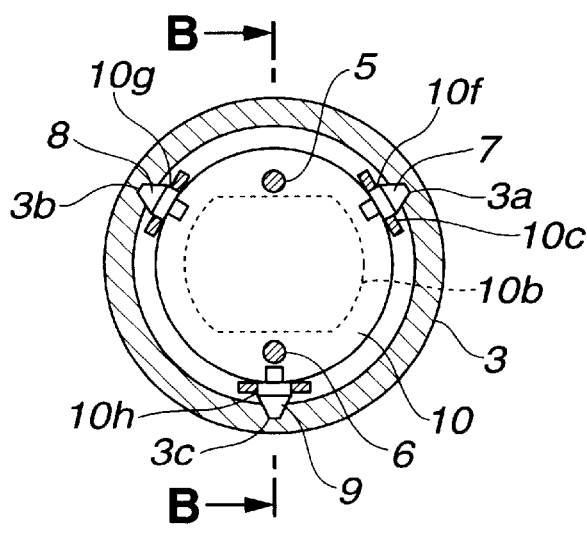
FIG. 2(A) is a cross-sectional view along line A—A of FIG. 1.
Figure 2B:
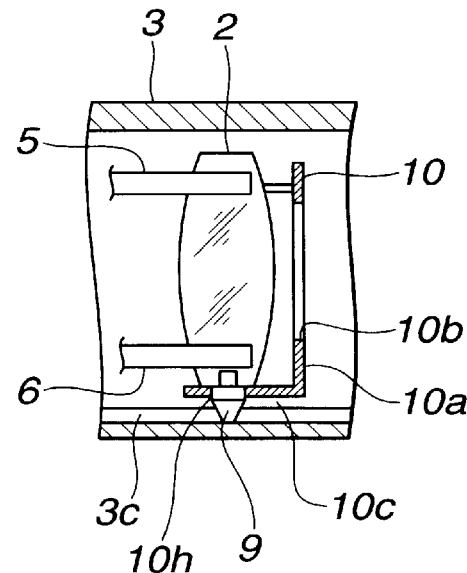
FIG. 2(B) is a cross-sectional view along line B—B of FIG. 2(A)

FIG. 1 is an exploded perspective view of a main portion of a lens housing having an aperture device of a first embodiment according to the present invention. FIG. 2(A) is a cross-sectional view along line A—A of FIG. 1. FIG. 2(B) is a cross-sectional view along line B—B of FIG. 2(A).

The main portion of the lens housing includes a moving frame 1, a lens 2, a cam cylinder 3, a guide axis 5, a rotation-stopping guide axis 6, and an aperture member 10.

The moving frame 1 may be an immobilized frame. It has an axis hole 1a in which the guide axis 5 is slidably inserted, and also has a cutout 1b in which the rotation-stopping guide axis 6 is slidably inserted.

The lens 2 is an optical element, formed from an optical-plastic. The guide axis 5 and the rotation-stopping guide axis 6 are immobilized parallel to an optical axis O. Three cam followers 7, 8, and 9 are provided in three outer-peripheral positions of the lens 2. Tapered end sections are formed on the cam followers 7, 8, and 9.

The cam cylinder 3 is supported so as to be rotatable and movable. Three cam grooves 3a, 3b, and 3c provided inside of the cam cylinder 3 slidably receive the cam followers 7, 8, and 9, respectively.

The aperture member 10 has a substrate section 10a an aperture opening 10b and three arm sections 10c, 10d, and 10e. The substrate section 10a is planar and is made of a thin metal plate and an optical element formed of a resin material. The aperture opening 10b is provided on the substrate section 10a for limiting incident light. Each of the arm sections 10c, 10d, and 10e is bent and extended from outer peripheral sections of the substrate section 10a in the direction of the optical axis O. Also, the arm sections 10c, 10d, and 10e have engagement openings 10f, 10g, and 10h, respectively. The respective engagement openings 10f, 10g, and 10h can receive the cam followers 7, 8, and 9 by the entire lengths thereof, or up to root sections thereof.

The aperture member 10 is fitted into a lens 2. In this case, the aperture member 10 is inserted over the lens 2 from the side of the lens opposing the side on which the guide axes 5 and 6 are fitted. Then, upper sections of the tapered end sections of the cam followers 7, 8, and 9 are moved to slide in order to elastically and outwardly bend the arm sections 10c, 10d, and 10e so that the root sections of the cam followers 7, 8, and 9 are inserted into the engagement openings 10f, 10g, and 10h. In the above embodiment, the aperture member 10 is arranged such that the aperture opening 10b is spaced by a predetermined distance from the surface of the lens 2.

In the lens housing configured as described above, when the cam cylinder 3 is rotated, the lens 2 which is slidably supported by the moving frame 1, is driven backward and forward along the optical axis O according to the cam grooves 3a, 3b, and 3c. The aperture member 10 also moves backward and forward together with the lens 2. Thereby, unnecessary light is rejected at the aperture opening 10b, and only effective light passes through the lens 2.

Thus, the arm sections 10c, 10d, and 10e are elastically bent so as to be received at and engaged with the root sections of the cam followers 7, 8, and 9 of the lens 2. This avoids a member dedicated for supporting the aperture member 10, thereby reducing the number of configuration components. This also significantly reduces space for arranging the aperture member.

Hereinbelow, a lens frame (lens housing) including an aperture device of a second embodiment of the present invention will be described.

Figure 3:
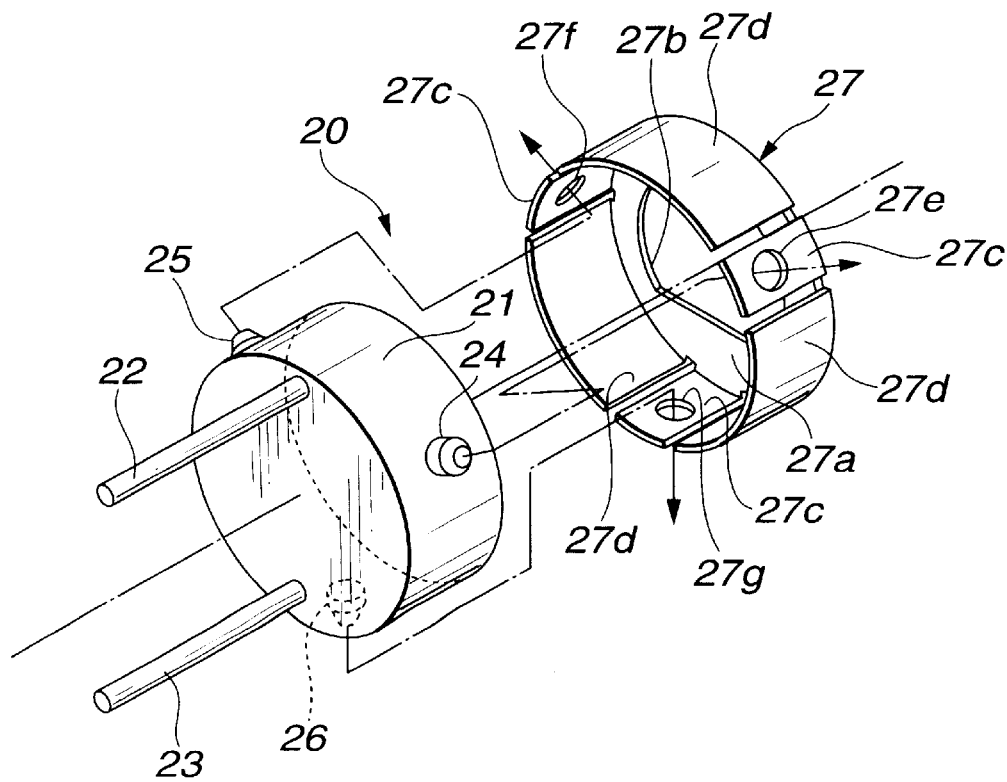
FIG. 3 is an exploded perspective view of a lens frame having an aperture device of a second embodiment according to the present invention.

FIG. 3 is an exploded perspective view of the lens frame 20. The lens frame 20 comprises a lens 21, guide axes 22 and 23, and an aperture member 27.

The lens 21 is an optical element formed with an optical plastic. It has guide axes 22 and 23, and three cam followers 24, 25, and 26 at three outer-peripheral positions so as to be driven backward and forward. Sliding portions at ends of the cam followers 24, 25, and 26 are formed as tapered end sections.

The aperture member 27 is made from a thin metal plate and a cylindrically formed plastic member. It has a substrate section 27a, a light-shielding cylindrical section 27d, and three arm sections 27c cut apart from the light-shielding cylindrical section 27d in the direction of optical axis O. The substrate section 27a has an aperture opening 27b for limiting incident light. The individual three arm sections 27c are elastically distortable in the direction perpendicular to the optical axis O. The respective arm sections 27c have engagement openings 27e, 27f, and 27g that can receive their cam followers 24, 25, and 26 by the entire lengths or up to root sections thereof.

The aperture member 27 is fitted over a lens 21. In this case, the aperture member 27 is fitted over the lens 21 from the side opposing the side where the guide axes 22 and 23 are fitted. Then, upper sections of the tapered end sections of the cam followers 24, 25, and 26 are moved to slide and to elastically and outwardly bent the arm sections 27c so that the root sections of the cam followers 24, 25, and 26 are inserted into the engagement openings 27e, 27f, and 27g. In the above embodiment, the aperture member 27 is arranged such that the aperture opening 27b is spaced by a predetermined distance from a surface of the lens 2. Also, the light-shielding cylindrical section 27d and the arm sections 27c cover an outer peripheral surface of the lens 21.

The lens frame 20 having the aperture device according to the second embodiment employs a structure in which the arm sections 27c are elastically bent so as to be received at, and engaged with, the root sections of the cam followers 24, 25, and 26 of the lens 21. In this case, also, advantages equivalent to the described first embodiment can be obtained. A particular feature is that installation of aperture member 27 causes the outer-peripheral surface of the lens 21 to be shielded from light. In a conventional structure in which an aperture member is fitted with a lens not having a lens-supporting frame, optical performance may be degenerated because of intrusion of the outside light. However, the described embodiment can prevent the degradation that may occur in the conventional structures.

The lens frame 20 of the described second embodiment has the engagement openings 27e, 27f, and 27g in the aperture member 27 for engagement with the cam followers 24, 25, and 26. However, the engagement openings 27e, 27f, and 27g are not always required. For example, as a modification in an aperture member installed on a lens having guide axes directly and immovably mounted thereon that does not require cam followers, it is possible to employ an aperture member that does not have engagement openings in the arm sections, but includes a cylindrical section for shielding the aperture member from light, which section is pressed and fitted over the outer periphery of the lens.

As another modification to the aperture member installed to a lens, such as a columnar lens or a square-columnar lens, which does not require cam followers and has guide openings that can be slidably received by guide axes provided on outer peripheral sections thereof, it is possible to use an aperture member that has either a light-shielding cylindrical frame or a square frame section that can be fitted over the outer peripheral sections of the lens.

Hereinbelow, a description will be given of a moving frame having an aperture device, that is a member of a lens housing, according to a third embodiment of the present invention.

Figure 4:
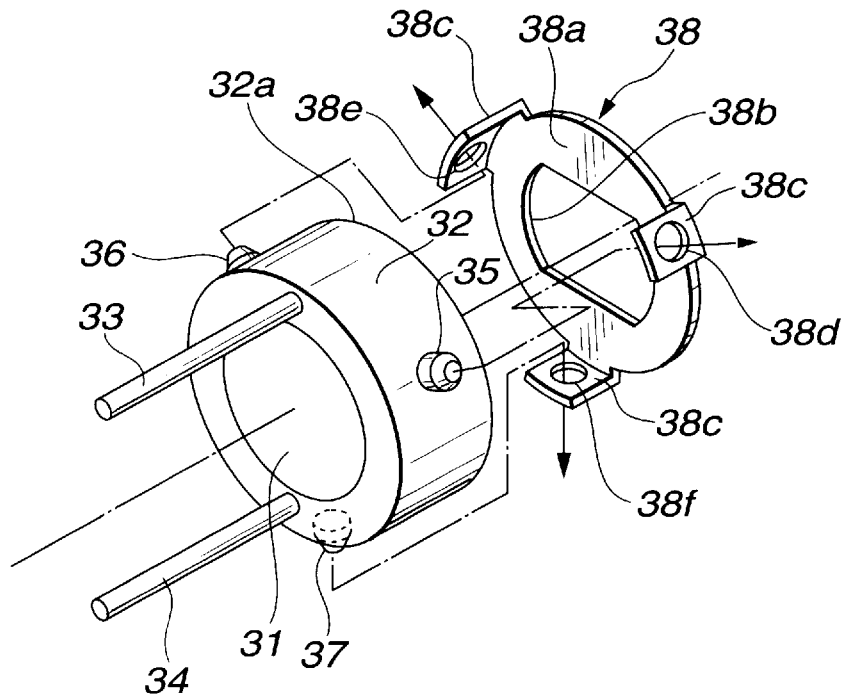
FIG. 4 is an exploded perspective view of a moving frame having an aperture device of a third embodiment according to the present invention.

FIG. 4 is an exploded perspective view of a moving frame 32 and an aperture device 38, corresponding to those described above. The moving frame 32 mainly supports a lens 31 that is an optical element formed from an optical plastic. The lens is supported such that it can be immobilized or move backward and forward. The moving frame 32 also moves backward and forward in relation to an immobilized frame (not shown).

Guide axes 33 and 34 are parallel to optical axis O and are immobilized on the moving frame 32. Also, cam followers 35, 36, and 37 are provided at three positions on the outer periphery of the moving frame 32. Also, an aperture device 38 to be described below is fitted over a side of the moving frame 32 opposite to the side that has the guide axes 33 and 34 mounted thereon. Sliding portions at ends of the cam followers 35, 36, and 37 are formed as tapered end sections.

The aperture member 38 is made from a thin metal plate and a plastics-formed member. It has a substrate section 38a and three arm sections 38c bent and extended from outer-peripheral sections of the substrate section 38a in the direction of an optical axis O. The aforementioned three arm sections 38c are elastically bendable in the direction perpendicular to the optical axis O. The respective arm sections 38c have engagement openings 38d, 38e, and 38f that can receive the cam followers 35, 36, and 37 by the entire lengths or up to the root sections thereof.

When the aperture member 38 is fitted to a lens 32, the aperture member 38 is fitted over a peripheral section of the moving frame 32 from the side opposing the side where the guide axes 33 and 34 are mounted. Then, upper sections of the tapered end sections of the cam followers 35, 36, and 37 are moved to slide and to elastically and outwardly bend the arm sections 38c so that the root sections of the cam followers 35, 36, and 37 are inserted into the engagement openings 38d, 38e, and 38f. In the above embodiment, the aperture member 38 is arranged such that the aperture opening 38b is spaced by a predetermined distance from the end surface 32a of the moving frame 32.

The aperture device according to the described third embodiment employs a structure in which the arm sections 38c are elastically distorted so as to be received at, and engaged with, the root sections of the cam followers 35, 36, and 37 of the moving frame 32. Accordingly, the occupied space and the number of the components can be reduced.

Hereinbelow, an aperture member, that is, an aperture device, according to a fourth embodiment of the present invention will be described.

Figure 5:
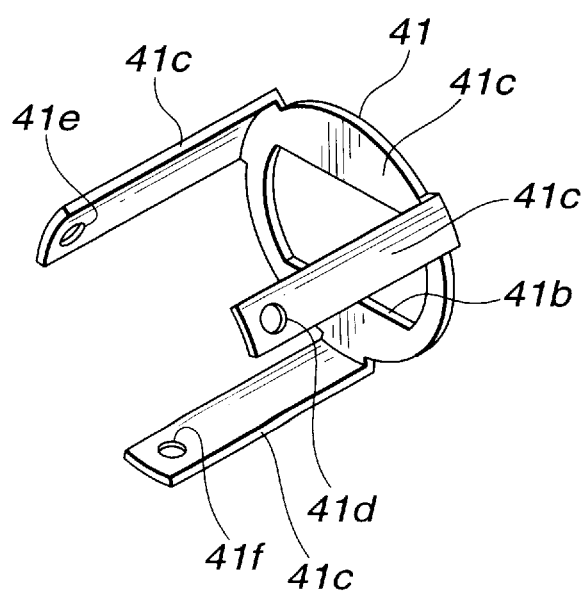
FIG. 5 is a perspective view of an aperture member according to a fourth embodiment of the present invention.

FIG. 5 is a perspective view of the aperture device. The aperture member 41 is formed of a thin metal plate or a plastic material. The aperture member 41 has a substrate section 41a and three arm sections 41c bent and extended from outer-peripheral sections of aperture member 41.

The substrate section 41a of the aperture member 41 has an aperture opening 41b for limiting the incident light. Also, the three arm sections 41c are elastically bendable in the direction perpendicular to an optical axis O, and are relatively long. The respective arm sections 41c have engagement openings 41d, 41e, and 41f that can receive the cam followers 35, 36, and 37 by the entire lengths thereof, or up to root sections thereof.

The fitting of the aperture member 41 to a lens having cam followers, or to a lens-supporting frame, is the same as fitting the aperture member 10 according to the first embodiment and the aperture member 38 according to the third embodiment. That is, engagement openings 41d, 41e, and 41f individually receive and engage with cam followers, thereby allowing the aperture member 41 to be installed.

In the aperture member of the fourth embodiment, according to the long arm sections 41c of the aperture member 41, the substrate section 41a can be spaced as desired from the end surface of a moving frame.

As described above, according to the lens housing having the aperture device, since the aperture member can be directly engaged with the cam followers for installation, the number of configuration components and occupied space can be reduced. This allows realization in cost reduction and miniaturization.

The present invention has been described with reference to what are presently considered to be the preferred embodiments. It is to be understood, however, that the invention is not limited to the disclosed embodiments. On the contrary, the invention is intended to cover various modifications and equivalent arrangements included within the spirit and scope of the invention.

What is claimed is:

1. A lens housing having an aperture device, comprising:
   a moving frame,
   cam followers on said moving frame, each cam follower including a portion radially extending away from said frame, and
   an aperture member engaged with said radially extending portions of said cam followers on said moving frame.

2. A lens housing having an aperture device as claimed in claim 1, wherein said aperture member has openings for engaging with said cam followers.

3. A lens housing having an aperture device as claimed in claim 1, wherein each of said cam followers has a conical portion and a cylindrical portion, and said aperture member engages with the cylindrical portion.

4. A lens housing having an aperture device as claimed in claim 1, wherein said aperture member has engagement sections for engaging with said cam followers, the engagement sections being elastically bendable.

5. A lens housing having an aperture device as claimed in claim 1, wherein an aperture surface of said aperture member is spaced from an end surface of said moving frame.

6. A lens housing having an aperture device as claimed in claim 1, wherein portions of said aperture member for engaging with said cam followers of said moving frame are end portions of arm sections extending by a predetermined distance from an aperture surface of said aperture member.

7. A lens housing having an aperture device as claimed in claim 1, wherein said aperture member includes a plurality of arms each extending away at an angle from a plane of said aperture member, said plurality of arms each including an engagement portion, wherein said plurality of arms deform elastically and outwardly to allow said engagement portions to receive said radially extending portions of said cam followers.

8. A lens housing having an aperture device, comprising:
   an optical element,
   cam followers on said optical element, each cam follower including a portion radially extending away from said optical element, and
   an aperture member engaged with said radially extending portions of said cam followers on said optical element.

9. A lens housing having an aperture device as claimed in claim 7, wherein said cam followers and said optical element are formed in one unit.

10. A lens housing having an aperture device as claimed in claim 9, wherein said cam followers and said optical element are formed by an injection-molding method.

11. A lens housing having an aperture device as claimed in claim 7, wherein each of said cam followers includes a conical portion and a cylindrical portion, and said aperture member is engageable with said cylindrical portion.

12. A lens housing having an aperture device as claimed in claim 7, said aperture member including engagement sections for engaging said cam followers, the engagement sections being elastically distortable.

13. A lens housing having an aperture device as claimed in claim 7, wherein said aperture member has a portion for covering an outer periphery of said optical element.

14. A lens housing having an aperture device as claimed in claim 7, wherein an aperture surface of said aperture member is spaced from a surface of said optical element.

15. A lens housing having an aperture device as claimed in claim 7, wherein portions of said aperture member for engaging with said cam followers of said optical element are end portions of arm sections extending by a predetermined distance from an aperture surface of said aperture member.

16. A lens housing having an aperture device as claimed in claim 8, wherein said aperture member includes a plurality of arms each extending away at an angle from a plane of said aperture member, said plurality of arms each including an engagement portion, wherein said plurality of arms deform elastically and outwardly to allow said engagement portions to receive said radially extending portions of said cam followers.

17. A lens housing having an aperture device as claimed in claim 8, wherein said aperture member has openings for engaging with said cam followers.

* * * * *